United States Patent [19]

Coxon

[11] 4,145,332

[45] Mar. 20, 1979

[54] ADHESIVES

[75] Inventor: George E. Coxon, London, England

[73] Assignee: Thorn Electrical Industries Limited, London, England

[21] Appl. No.: 724,518

[22] Filed: Sep. 20, 1976

[30] Foreign Application Priority Data

Sep. 26, 1975 [GB] United Kingdom .............. 39604/75

[51] Int. Cl.$^2$ ............................................... C08K 3/22
[52] U.S. Cl. ............................ 260/42.52; 260/33.2 R; 260/33.4 R; 260/38; 313/315
[58] Field of Search ............. 260/38, 47 R, 52, 32.8 R, 260/33.2 R, 33.4 R, 42.52; 313/315

[56] References Cited

U.S. PATENT DOCUMENTS

| 3,576,788 | 4/1971 | Harris | 260/52 |
|---|---|---|---|
| 3,632,555 | 1/1972 | Harris | 260/47 EA |
| 3,787,350 | 1/1974 | Harris | 260/32.8 R |
| 3,838,103 | 9/1974 | Edwards | 260/52 |
| 3,936,510 | 2/1976 | Harris | 260/38 |
| 3,960,982 | 6/1976 | Numata | 260/52 |

*Primary Examiner*—Paul R. Michl
*Attorney, Agent, or Firm*—Robert F. O'Connell

[57] ABSTRACT

A lamp capping cement for electric lamps comprises a resin component consisting essentially of a condensation product of an aralkyl ether and a phenol mixed with a cross-linkable polymer or resin, a heat-resistant filler component, and a liquid diluent. The preferred cross-linkable polymer is a carboxylated acrylic polymer which may constitute 1 to 15% of the cement. This cement is capable of withstanding higher operating temperatures in incandescent filament lamps without breakdown.

3 Claims, 1 Drawing Figure

U.S. Patent     Mar. 20, 1979     4,145,332
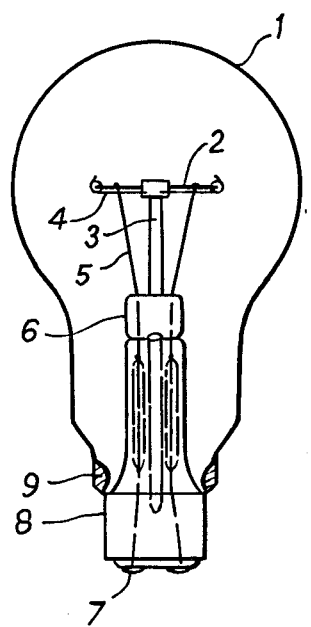

ADHESIVES

The invention relates to capping cements for electric lamps. These cements are synthetic resin adhesives capable of withstanding elevated temperatures, possibly intermittently, for long periods, and are therefore suitable, for example, for use in incandescent lamps. The invention also relates to electric lamps incorporating such adhesives.

One of the operations of conventional lamp manufacture consists in cementing a cap, usually of metal such as brass or aluminium, to the lamp envelope or bulb in which the internal components such as a filament are already fitted. The resulting cemented connection must be heat resistant, especially in the case of incandescent filament lamps, since the temperature of the cap during burning of such lamps is in many cases above 200° C. A cement used in such lamps must therefore resist such temperatures for a long period, notably 1000–2000 hours, for the life of the lamp.

Conventional thermosetting "capping pastes" contain mixtures of synthetic novolak type phenolic resins and natural resins such as shellac and rosin. Attempts have been made to extend the temperature capabilities of these pastes by the addition of silicone resins up to levels of 6% solids by weight. It is intended that the silicone material should hold the bulk of the cement together, although it does not impove the adhesive properties at these high temperatures. If silicone is not added, the phenolic-based paste chars and crumbles whenever lamps are burnt in hot fittings and as a result the cap may eventually become detached from the lamp, raising problems of safety when the detached cap is removed from the holder, or the risk of injury or fire if the hot bulb falls out of the holder. Hitherto, lamp producers have been unable to supplement the phenolic-based pastes with enough silicone to meet the requirements for an operating temperature above 210° C., which is the maximum temperature allowed for the pasted cap of a normal GLS lamp (see "Lamps & Lighting" 2nd Edition 1972, Chapter 9, Section 9.1, page 172, General Lighting Service Lamps) in a fitting conforming to British Standard BS.4533. Not only are the silicone additives many times the cost of phenolic resin, but attempts to add sufficient silicone resin, which is dissolved in a solvent, result in a paste which is unusable in that the paste remains tacky and the caps stick together and block the feed mechanism to lamp capping machines. Moreover, the solvents, for example xylene, employed for the addition of silicone are toxic and can also destroy the rubber connections which are widely used in lamp making machinery.

The present invention now provides a heat-resistant thermosetting lamp capping cement comprising a resin component consisting essentially of a mixture of a condensation product of an aralkyl ether and a phenol combined with a cross-linkable polymeric substance, a heat resistant filler component and a solvent or diluent.

The invention also provides an electric lamp having a cap cemented to an envelope or bulb wherein the cement comprises the reaction product of a condensation product of an aralkyl ether and a phenol with a cross-linkable polymer, together with a heat-resistant filler.

Condensation products of aralkyl ethers and phenol are available commercially. One example is sold by Albright and Wilson Ltd. under the Trade Mark XYLOK. "Xylok" is sold in a number of forms having different properties: Xylok 210 is ordinarily available as a 60% solution in methyl ethyl ketone (MEK) or 74° OP ethanol and the resin is cured by condensation with hexamine catalyst which is incorporated in the solution; Xylok 225 consists of a dry powder form of the resin to which is added 10–15% of hexamine agent (based on the weight of resin) to cure the resin; Xylok 234C is a flexible resin which is cured by an epoxy mechanism. By using the Xylok component in the paste a thermally stable adhesive (up to 250° C.) can be achieved which ensures efficient adhesion of the cap even at the end of life in the hottest fittings allowable by the British Standard.

The preferred cross-linkable polymer or resin is a carboxylated acrylic polymer, especially that sold by Allied Colloids Ltd. under the Trade Mark "ALCOLEC". This material has the form of a free flowing powder and imparts improved flow characteristics to the cement as well as acting as an adhesive. It is likely that this acrylic material crosslinks with the aralkyl ether/phenol condensation product to produce a more intractable polymer contributing to the stability of the cured paste.

It is contemplated that, as an alternative to a carboxylated acrylic polymer, a thermosetting condensation product such as phenol-formaldehyde, urear-formaldehyde or melamine-formaldehyde could be used with a similar result. A further alternative to the acrylic polymer is shellac.

Organic polar liquids such as ketones, esters, alcohols and ether solvents can be used as solvent, which is added to assist solubility of the resins and fillers. The preferred solvent, which is compatible with this capping cement and with accepted lamp making practice, is 74° OP ethanol or methylated spirit. To increase the drying time, solvent blends of ethanol with 2-ethoxyethanol (sold under the Trade Marks CELLOSOLVE or OXITOL) can be used. Rosin can be included in the formulation to improve the solvent retention properties.

To ensure that the paste when fixed to the inside of the cap does not flow or sag when stored in a random manner in hoppers, an anti-slumping agent can be added to the mixtures. An addition of 1–2% by weight of fumed silica or alumina is preferably added to the solvent or resin solution for this purpose.

Preferred ranges of the polymeric components in the capping cements according to the invention are:
  1 – 15% aralkyl ether/phenol condensate (calculated as % solids out of the total dry solids)
  1 – 15% carboxylated acrylic polymer or alternative cross-linkable resin.

The balance is filler whose preferred composition is marble dust and lithopone. The ratio of these is variable but preferably from 1:1 up to 1:5 by weight. Solvent levels are variable according to the particular application but are normally in the range of 6–12 parts ethanol solvent to 100 parts of dry powder mixture of resin plus filler. To increase the drying time, solvent blends of 74° OP ethanol (or methylated spirit) and 2-ethoxy-ethanol ranging in proportion from 1:1 to 1:10 may be used.

By way of illustration, there will now be described specific examples describing preferred methods of producing cements and applying them in lamp manufacture in accordance with the invention.

The accompanying drawing shows one example of an incandescent lamp in which the invention can be employed.

The lamp in the drawing comprises a glass envelope or bulb 1 enclosing a coiled tungsten filament 2 supported by a central glass piller 3, molybdenum filament supports 4 and lead wires 5. The lead wires pass through a pinch seal 6 and are connected to soldered contacts 7 mounted in a base cap 8 which may be, for example, of bayonet type as shown or a screw-threaded fitting. The cap is secured to the bulb 1 by a ring of cement 9, which may be formulated in accordance with this invention.

Examples 1 and 2 each describe the production of 1kg of paste.

EXAMPLE 1

A cement was manufactured using the following components:

84g Aralkyl ether/phenol condensate (Xylok 210 as a 60% solution in 74° OP ethanol).
50g Carboxylated acrylic polymer (Alcolec 860)
30g Fumed alumina (Alon C)
870g Filler (marble dust and lithopone, 4:1)
45g Ethanol (74° OP)

If longer drying times are required, the solvent can be replaced by mixtures of 74° OP ethanol and 2-ethoxyethanol or other suitable polar solvents. One example of such a mixture is 5g 74° OP ethanol plus 40g "Cellosolve".

In the production of this paste, the polymers, alumina and solvent are mixed together until a clear, brown syrup is obtained. The filler is then added slowly with thorough mixing.

EXAMPLE 2

A cement was manufactured using the following components:

45g Aralkyl ether/phenol condensate (Xylok 225)
50g Carboxylated acrylic polymer (Alcolec 860)
5g Hexamine
30g Fumed alumina (Alon C)
870g Filler (marble dust and lithopone, 4:1)
80g Ethanol (74° OP)

If longer drying times are required, a solvent blend is used varying from 1:1 ethanol to "Cellosolve" to 1:10 ethanol to "Cellosolve". Other suitable polar solvents can also be used.

In the production of this paste, the polymers, hexamine and filler are thoroughly blended dry together and added with mixing to a mixture of the alumina and solvent.

The performance of the capping paste in accordance with this invention was evaluated in tests on 100w single coil filament lamps in 60 mm diameter so-called Ribbon Pear Shape pearl glass envelopes, in a fitting which produces cap temperatures of 210° C. Aluminium bayonet caps were pasted on conventional machines using the paste of the invention and also conventional phenolic resin based pastes fortified with approximately 3% dry weight silicone. After testing by lamp operation to ultimate failure at approximately 1000 hours in the hot fitting described, the adhesion of the cap at the end of life was measured by the standard torsion test of BS 161, using MKS units.

In a typical trial using a silicone-enriched phenolic paste on aluminium caps, 13 lamps were tested in hot fittings. Torsion measurements at the end of life were: 6 lamps > 3 N m (5 > 4 N m), 7 lamps < 3 N m. In contrast, using a paste according to this invention the results for 20 lamps tested were: 18 lamps > 3 N m (18 > 4 N m), 2 lamps < 3 N m (including 1 loose cap due to inefficient pasting).

In the case of lamps embodying the invention, the average torsion figures have always been found to be greater than the value of 3 N m minimum required by BS 161 and usually greater than 5 N m. Standard phenolic/silicone pastes usually average 3 N m but a substantial proportion are on the low side. This is accentuated by the use of aluminium bayonet caps in which adhesion is usually less than with similar caps of brass. In the case of the pastes of the invention, the adhesion to the aluminium was exceptionally good and it was found that peeling the skirt of the lamp cap took with it a thick coating of cured paste — even at the end of life in these fittings. No paste whatever adhered when the peeling test was repeated for the conventional phenolic/silicone capping paste.

I claim:

1. In an electric lamp having a bulb or envelope, at least one end cap mounted thereon, and a body of lamp capping cement securing said cap to said tube or envelope, the improvement in which said body of cement comprises the reaction product of a condensation product of an aralkyl ether and a phenol with a cross-linkable carboxylated acrylic polymer, together with a heat-resistant filler.

2. In an electric lamp having a body of lamp capping cement according to claim 1, said body of cement containing 1 to 15% of the cross-linkable carboxylated acrylic polymer.

3. In an electric lamp having a body of lamp capping cement according to claim 1, said body of cement containing an anti-slumping agent.

* * * * *